(12) United States Patent
Goranov

(10) Patent No.: US 10,200,441 B2
(45) Date of Patent: Feb. 5, 2019

(54) METHODS, AN ONLINE OBJECT, A WEB-BASED MESSAGE EXCHANGE SERVER, A MOBILE DEVICE, A TARGET OFFLINE OBJECT, A NETWORK AND A COMPUTER PROGRAM PRODUCT

(71) Applicant: Ubiqu B.V., Rotterdam (NL)

(72) Inventor: Boris Petrov Dokov Goranov, Rotterdam (NL)

(73) Assignee: Ubiqu B.V., Rotterdam (NL)

( * ) Notice: Subject to any disclaimer, the term of this patent is extended or adjusted under 35 U.S.C. 154(b) by 163 days.

(21) Appl. No.: 15/106,146

(22) PCT Filed: Dec. 19, 2014

(86) PCT No.: PCT/NL2014/050886
§ 371 (c)(1),
(2) Date: Jun. 17, 2016

(87) PCT Pub. No.: WO2015/093959
PCT Pub. Date: Jun. 25, 2015

(65) Prior Publication Data
US 2017/0034241 A1 Feb. 2, 2017

(30) Foreign Application Priority Data
Dec. 20, 2013 (NL) .................................. 2011999

(51) Int. Cl.
*G06F 15/16* (2006.01)
*H04L 29/08* (2006.01)
(Continued)

(52) U.S. Cl.
CPC .......... *H04L 67/02* (2013.01); *H04L 12/2803* (2013.01); *H04L 12/2807* (2013.01);
(Continued)

(58) Field of Classification Search
CPC ................ H04L 12/2803–12/2838; H04L 67/02–67/025
See application file for complete search history.

(56) References Cited

U.S. PATENT DOCUMENTS

2003/0018753 A1* 1/2003 Seki ................... H04L 12/2803
709/219
2006/0142880 A1* 6/2006 Deen ..................... G05B 15/02
700/19
(Continued)

FOREIGN PATENT DOCUMENTS

| EP | 1195997 A2 | 4/2002 |
| GB | 2394340 A | 4/2004 |
| NL | 2011717 C | 5/2015 |

OTHER PUBLICATIONS

Feb. 10, 2015—International Search Report and Written Opinion of PCT/NL2014/050886.

*Primary Examiner* — Brendan Y Higa
(74) *Attorney, Agent, or Firm* — Banner & Witcoff, Ltd.

(57) ABSTRACT

The invention relates to a method for transmitting a message from an online object to an offline object. The method comprises the step of generating and transmitting, from an online object, a message to a web-based message exchange server. The message includes identification data. Upon receipt, the message exchange server forwards the message to a mobile device. Further, a data connection is established between the mobile device and a target offline object for delivery of the message at the offline object.

15 Claims, 3 Drawing Sheets

(51) Int. Cl.
*H04L 12/28* (2006.01)
*H04L 29/06* (2006.01)
*H04W 88/02* (2009.01)

(52) U.S. Cl.
CPC ...... *H04L 12/2814* (2013.01); *H04L 12/2818* (2013.01); *H04L 67/025* (2013.01); *H04L 67/42* (2013.01); *H04W 88/02* (2013.01)

(56) References Cited

U.S. PATENT DOCUMENTS

| | | | |
|---|---|---|---|
| 2007/0093974 A1* | 4/2007 | Hoogenboom | G06F 17/30861 702/35 |
| 2011/0039584 A1* | 2/2011 | Merrett | H04L 51/36 455/466 |
| 2013/0035077 A1 | 2/2013 | Tsai | |
| 2013/0097243 A1 | 4/2013 | Park | |
| 2013/0162412 A1 | 6/2013 | Yu et al. | |

* cited by examiner

METHODS, AN ONLINE OBJECT, A WEB-BASED MESSAGE EXCHANGE SERVER, A MOBILE DEVICE, A TARGET OFFLINE OBJECT, A NETWORK AND A COMPUTER PROGRAM PRODUCT

CROSS-REFERENCE TO RELATED APPLICATIONS

This application is a U.S. National Stage application under 35 U.S.C. § 371 of International Application PCT/NL2014/050886 (published as WO 2015/093959 A1), filed Dec. 19, 2014, which claims priority to Application NL 2011999, filed Dec. 20, 2013. Benefit of the filing date of each of these prior applications is hereby claimed. Each of these prior applications is hereby incorporated by reference in its entirety.

FIELD OF THE INVENTION

The present invention relates to a method for transmitting a message from an online object to an offline object.

BACKGROUND OF THE INVENTION

Several systems are known for transmitting information between online servers. However, if transmittal of information towards or from an offline object is desired, people physically access the offline object, input or output data from the offline object, e.g. using dedicated hardware, and exchange data with a central server, e.g. via said dedicated hardware.

There is a need for simplifying the above described process of exchanging information with an offline object.

SUMMARY OF THE INVENTION

It is an object of the invention to provide a simplified method for transmitting a message from an online object to an offline object. Thereto, according to the invention, a method is provided, comprising the steps of providing an online object generating a message including identification data of a target offline object, and transmitting the message from the online object to a web-based message exchange server for forwarding the message to a mobile device that is arranged to deliver the message at the target offline object.

Further, according to the invention, a method is provided, comprising the steps of providing a web-based message exchange server, receiving, at the message exchange server, a message that is generated and transmitted by an online object, the message including identification data of a target offline object, and forwarding, by the message exchange server, the message to a mobile device that is arranged to deliver the message at the target offline object.

In addition, according to the invention, a method is provided, comprising the steps of providing a mobile device, receiving, by the mobile device, a message from a message exchange server, the message including identification data of a target offline object, establishing a data connection between the mobile device and the target offline object, and delivering the message at the target offline object.

Also, a method is provided, comprising the steps of establishing a data connection between a mobile device and a target offline object, and receiving, at the target offline object, a message from the mobile device, wherein the message includes identification data of the target offline object, and wherein the message has been generated by an online object, has been transmitted to a message exchange server, and has been forwarded from the server to the mobile device.

By employing a dedicated web-based network structure, in principle any standard mobile device, such as telephone, smartphone etc, can be used to transmit messages from the online object to the offline object, thereby rendering a dedicated mobile device superfluous and saving costs.

The invention also relates to an online object, a web-based message exchange server, a mobile device and an offline object.

Further, the invention relates to computer program products. A computer program product may comprise a set of computer executable instructions stored on a data carrier, such as a CD or a DVD. The set of computer executable instructions, which allow a programmable computer to carry out the methods as defined above, may also be available for downloading from a remote server, for example via the Internet or via an app.

Other advantageous embodiments according to the invention are described in the following claims.

BRIEF DESCRIPTION OF THE DRAWINGS

By way of example only, embodiments of the present invention will now be described with reference to the accompanying figures in which.

It is noted that the figures show merely a preferred embodiment according to the invention. In the figures, the same reference numbers refer to equal or corresponding parts.

DETAILED DESCRIPTION OF THE INVENTION

Figure 1:
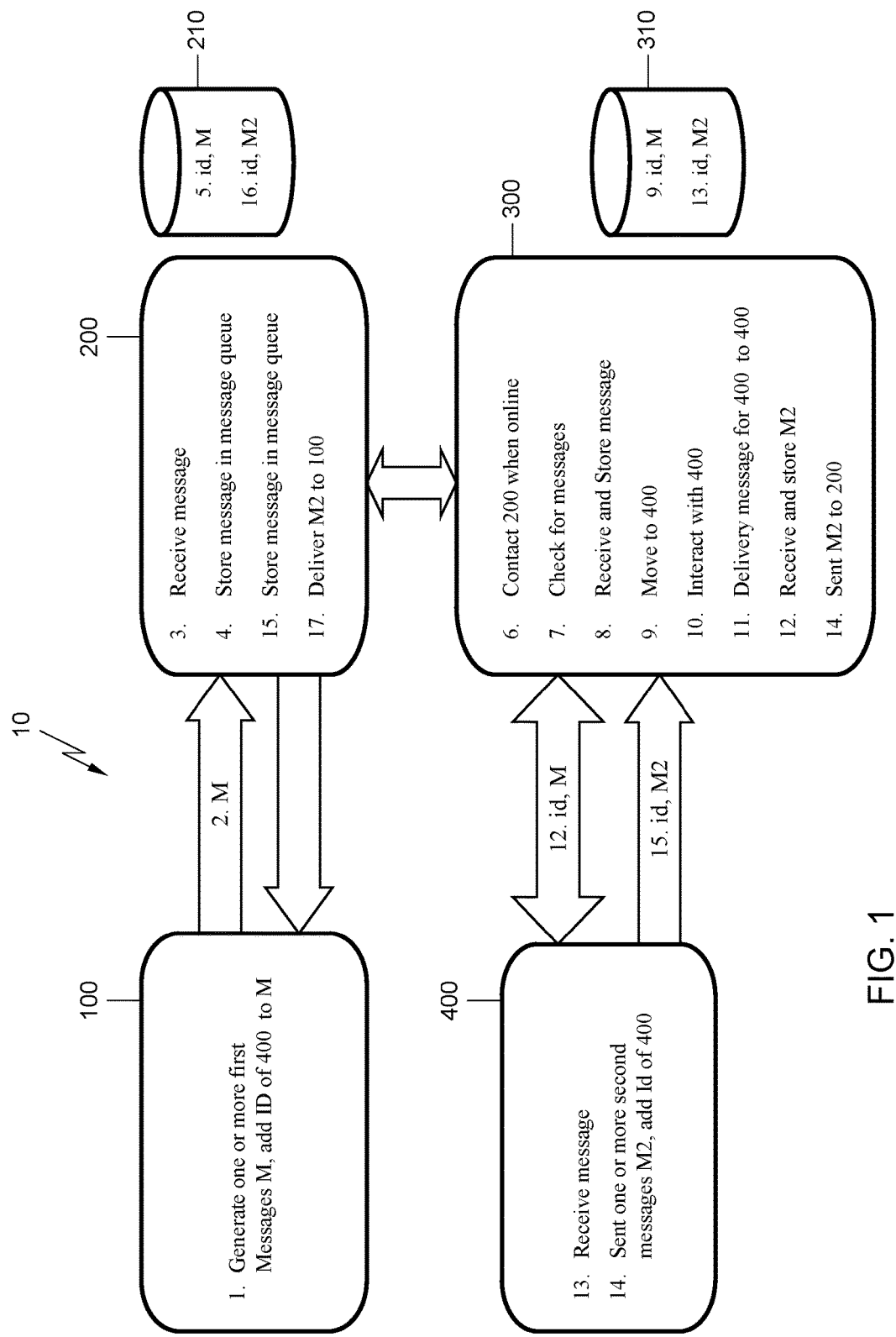
FIG. 1 shows a network comprising an online object, a message exchange server, a mobile device and an offline object according to the invention.

FIG. 1 shows a network 10 comprising an online object 100, a message exchange server 200, a mobile device 300 and an offline object 400 according to the invention. The online object 100 and the offline object 400 are functionally associated. Generally, the online object 100 is an online software application, e.g. a registration application, for controlling operation of the offline object 400, e.g. a vehicle, a refrigerator, an electric appliance, etc. The online object 100 can be run on a user workplace application, such as a PC, a tablet etc. The network 10 is arranged for exchanging messages between the online object 100 and the offline object 400.

The message exchange server 200 is web-based and has a data connection to the online object 100, e.g. via Internet. Further, the mobile device 300 is an electronic communication device that is intermittently connected to the web-based message exchange server 200, e.g. via a wireless connection. In a first time period the mobile device 300 may be connected to the message exchange server 200, via a data channel, while in a second time period the mobile device 300 is not connected to the message exchange server 200. As an example, the mobile device 300 is implemented as a mobile phone, a smartphone, a PDA, a tablet etc.

The online object 100, the message exchange server 200, the mobile device 300 and the offline object 400 are each provided with at least a processor for performing process steps as explained in more detail below. The online object 100, the message exchange server 200, the mobile device 300 and the offline object 400 may comprise further modules for performing specific process steps. As an example, the offline object 400, also called target offline object, may comprise an antenna for receiving wireless data from the mobile device 300.

The message exchange process can be initiated by the online object 100 by generating a message M including identification data ID of the target offline object 400. The identification data ID can be added after generating a message string, or can immediately be integrated in the process of generating the message M. Then, the message is transmitted from the online object 100 to the web-based message exchange server 200, via the above-mentioned data connection interconnecting the server 200 to the online object 100. Accordingly, the message M is received by the message exchange server 200. Preferably, the message M is stored in a server memory 210 to enable the server 200 to forward the message M at a later instant and/or for evaluation purposes.

When the message is available at the message exchange server 200, the message M is forwarded to the mobile device 300.

If the mobile device 300 is online, i.e. having an active communication channel with the message exchange server 200, the message M can be transmitted to the mobile device 300 immediately. Alternatively, the message exchange server 200 can be arranged to periodically check whether an outstanding message M has been received, so as to transmit any message to the mobile device 300 after the periodic check. Further, the mobile device 300 can be arranged to contact the message exchange server 200 in order to check whether any message is waiting at the message exchange server 200.

If the mobile device 300 is offline, i.e. if no data channel between the mobile device 300 and the message exchange server 200 is active, the step of forwarding the message M to the mobile device 300 may include a number of substeps, including the substep of establishing a connection between the message exchange server 200 and the mobile device 300, the substep of checking whether a message M has been received by the message exchange server 200 during a time period TP running from a disconnection instant moment of a previous connection period wherein the message exchange server 200 and the mobile device 300 were connected, and the substep of transmitting any message that has been received in said time period. By re-establishing a communication channel, the message M can be transmitted to the mobile device 300.

The mobile device 300 can be offline for a number of reasons. As an example, the mobile device 300 can temporarily be located at a location that is not supported by a provider establishing data connections between the mobile device 300 and the server 200. Further, the device may be shielded from wireless systems establishing the connection. In addition, the device may be switched off or may lack transmission power.

In this respect it is noted that the connection between the mobile device 300 and the message exchange server 200 may have a permanent nature, e.g. when providing a permanent wired connection.

Advantageously, the forwarding step may include the substep of notifying the mobile device 300 that a message M has been received at the message exchange server 200. The mobile device 300 can be notified either in the online state or in the offline state. A notifying message can be sent via an active data channel that is also suitable for transmitting the message M itself. However, the notifying message can also be sent via a separate data channel connecting the mobile device 300 to the message exchange server 200. Further, the process may also be performed without notifying, e.g. by directly transmitting the message to the mobile device 300.

Preferably, the message M is stored in a memory 310 of the mobile device 300 to enable the mobile device 300 to deliver the message M at a later instant and/or for evaluation purposes.

Upon receipt of the message M at the mobile device 300, a data connection is established between the mobile device 300 and the target offline object 400. Then, the message M is delivered at the target offline object 400, via said data connection, e.g. via a wired data channel or via a wireless data channel.

The step of establishing a data connection between the mobile device 300 and the target offline object 400 may include the substep of moving the mobile device 300 to the neighborhood of the offline object, e.g. for setting up a short range wireless connection or for setting up a wired connection. In the process of establishing a data connection, the mobile device 300 and the offline object 400 may interact with each other, e.g. for performing an identification process. Then, the step of delivering the message at the target offline object may include the substep of verifying whether the identification data included in the message M correspond to identification features of the target offline object 400.

In a specific embodiment, the offline object 400 generates a second message M2 including identification data ID of the offline object 400, e.g. in order to respond to the original message M. Then, the second message M2 is transmitted to the mobile device 300 that forwards the second message M2 to the message exchange server 200 to deliver the second message M2 at the online object 100, based on a similar process as described above.

Usually, the data connection between the mobile device and the target offline object is temporarily, e.g. for the purpose of saving energy or due to the fact the mobile device 300 and the target offline object 400 can not maintain the data connection, e.g. due to remote distance or an interrupted line of sight. The data connection can be set up after the mobile device 300 has received the message M from the message exchange server 200. This typically occurs when the mobile device 300 and the target offline object 400 are brought in their mutual proximity. In practice, some time may lapse between receipt of the message, at the mobile device 300, and the time instant that the data connection between the mobile device 300 and the target offline object 400 can be established.

Further, the data connection between the mobile device 300 and the target offline object 400 can be terminated after receiving the message from the mobile device 300 at the target offline object 400 or after receiving the second message M2 from the target offline object 400 at the mobile device.

The message M may contain an instruction, e.g. for performing a specific task such as releasing a lock, for remotely controlling a process at the offline object 400. Alternatively, the message M may contain a request, e.g. for sending information to the online object 100, e.g. about a status of the offline object 400.

It is noted that a single or a multiple number of messages M and/or a single or a multiple number of second messages M2 can be exchanged between the online object 100 and the offline object 400 in accordance with the above-described process. Further, multiple messages M can be exchanged between online objects 100 and corresponding offline objects 400, via a single message exchange server 200 or a few message exchange servers 200. In addition, a single message M can be transmitted to a multiple number of target offset objects 400, e.g. by including a multiple number of identification data associated with the intended target offline objects 400.

It is further noted that the step of forwarding the message M from the message exchange server 200 to the mobile device 300 may include the substep of performing an eligibility test, e.g. for efficiency and/or security reasons. Similarly, it may be verified whether the mobile device 300 is authorized to deliver the message M at the offline object 400.

In a particular embodiment, the message exchange server 200 includes a database with a multiple number of mobile devices that may interact with the server 200, e.g. via a data connection that is active on an intermittent basis. In the database, the multiple number of mobile devices 300 are associated with corresponding offline objects 400 having unique identification data. Based on the information in the database, the message exchange server 200 may select a single or a multiple number of mobile devices 300 that are associated with the offline object 400 having the identification data included in the message M.

The above-mentioned substep of performing an eligibility test may include verifying whether a message M received from the online object 100 should be forwarded to a particular mobile device 300 or not. The eligibility test may include one or more specific criteria, such as the criterion whether the particular mobile device 300 is actually connected to the server 200 or not, or the criterion whether the particular mobile device 300 is authorized to communicate with the offline object 400, or not. Further, a criterion can be whether the mobile device 300 was connected to the server 200 in a predetermined past period, or not. In addition, a criterion can be whether it is probable that a connection between the mobile device 300 and the server 200 is established, or not. In principle, the eligibility test may be performed at least partially on the server 200 and/or on the mobile device 300.

Alternatively, no eligibility test is performed. Then, the message M is forwarded to any mobile device 300 having a connection with the server 200.

Advantageously, the message M is encrypted by the online object 100 or the message exchange server 200. Then, the offline object 400 is arranged for decrypting the message M. Similarly, the offline object 400 and the online object 100 may be arranged for encrypting and decrypting, respectively, the second message M2. In order to provide secure encryption/decryption keys, a secure session can be set up, e.g. using the process as described by the applicant in the Dutch application NL 2011717. As an example, a secure session can be set up between the online object 100 and the offline object 400, between the message exchange server 200 and the offline object 400, or between the mobile device 300 and the offline object 400.

The network 1 shown in FIG. 1 includes the online object 100, the web-based message exchange server 200, the mobile device 300 and the target offline object 400. During operation of the network 1, some modules may be disconnected. As an example, when the mobile device 300 is remote from the offline object 400, the connection between the mobile device 300 and the offline object 400 may be inactive. Similarly, when the mobile device 300 is inaccessible for the message exchange server 200. Then, the network may temporarily include less actively connected modules, e.g. only the online object 100 and the message exchange server 200.

Figure 2A:
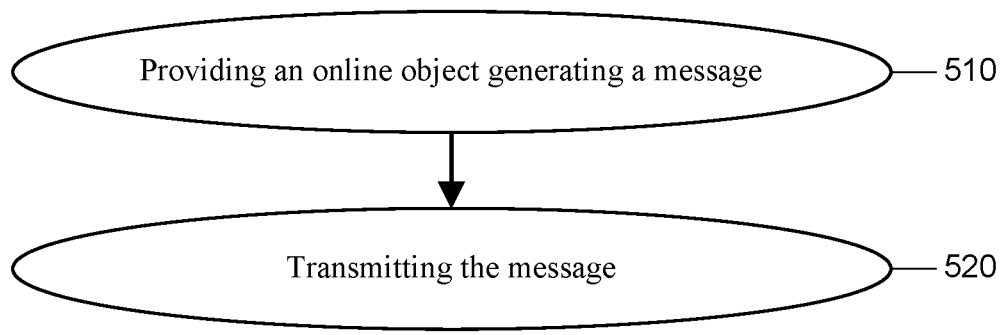
FIG. 2A shows a flow chart of a method according to the invention being performed by the online object shown in FIG. 1.

FIG. 2A shows a flow chart of a method according to the invention being performed by an online object. The method is applied for transmitting a message from an online object to an offline object. The method comprises a step of providing 510 an online object generating a message including identification data of a target offline object. Further, the method comprises a step of transmitting 520 the message from the online object to a web-based message exchange server for forwarding the message to an intermittently connected mobile device that is arranged to deliver the message at the target offline object.

Figure 2B:
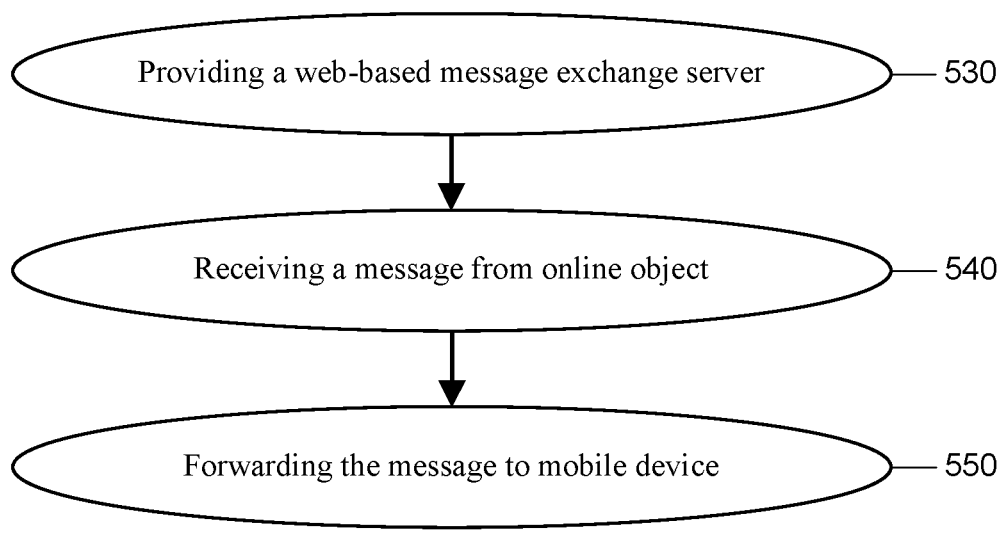
FIG. 2B shows a flow chart of a method according to the invention being performed by the message exchange server shown in FIG. 1.

FIG. 2B shows a flow chart of a method according to the invention being performed by a web-based message exchange server. The method is applied for transmitting a message from an online object to an offline object. The method comprises a step of providing 530 a web-based message exchange server, and a step of receiving 540, at the message exchange server, a message that is generated and transmitted by an online object, the message including identification data of a target offline object. Further, the method comprises a step of forwarding 550, by the message exchange server, the message to an intermittently connected mobile device that is arranged to deliver the message at the target offline object.

Figure 2C:
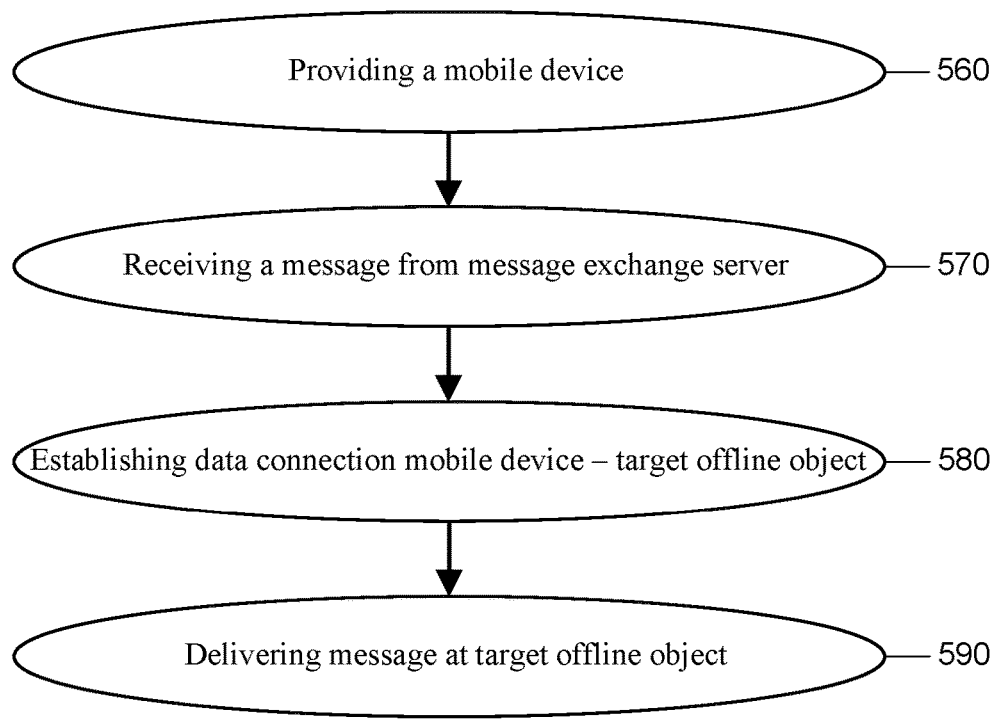
FIG. 2C shows a flow chart of a method according to the invention being performed by the mobile device shown in FIG. 1.

FIG. 2C shows a flow chart of a method according to the invention being performed by a mobile device that is intermittently connected to a web-based message exchange server. The method is applied for transmitting a message from an online object to an offline object. The method comprises a step of providing 560 a mobile device intermittently connected to a web-based message exchange server, and a step of receiving 570, by the mobile device, a message from the message exchange server, the message including identification data of a target offline object. Further, the method includes a step of establishing 580 a data connection between the mobile device and the target offline object, and a step of delivering 590 the message at the target offline object.

Figure 2D:
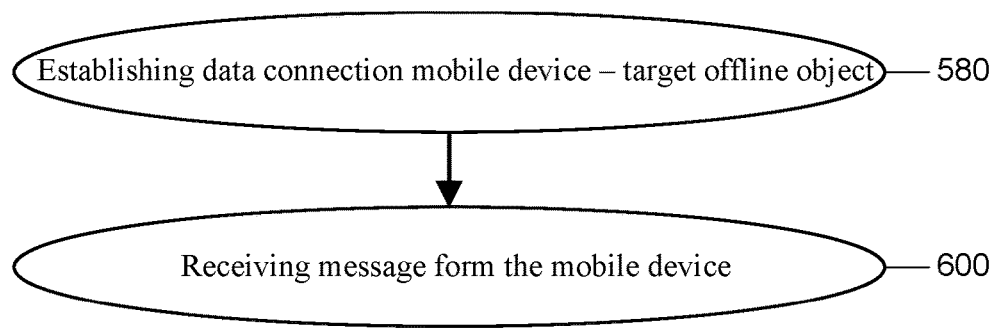
FIG. 2D shows a flow chart of a method according to the invention being performed on the offline object shown in FIG. 1.

FIG. 2D shows a flow chart of a method according to the invention being performed by an offline object. The method is applied for transmitting a message from an online object to an offline object. The method includes a step of establishing 580 a data connection between a mobile device and a target offline object, the mobile device being intermittently connected to a web-based message exchange server, and a step of receiving 600, at the target offline object, a message from the mobile device, wherein the message includes identification data of the target offline object, and wherein the message has been generated by an online object, has been transmitted to the message exchange server, and has been forwarded to the mobile device.

The above defined methods can be performed using dedicated hardware structures, such as FPGA and/or ASIC components. Otherwise, the methods can also at least partially be performed using a computer program product comprising instructions for causing a processing unit of the online object, the message exchanger server, the mobile device and the offline object to perform the above described steps of the methods according to the invention. All steps of said methods can in principle be performed on a single processor. However, it is noted that, in principle, steps of a specific method can be performed on separate processing units. As an example, the step of generating a message can be performed on a first processing unit, while the step of transmitting the message can be performed on a second processing unit.

It will be understood that the above described embodiments of the invention are exemplary only and that other embodiments are possible without departing from the scope of the present invention. It will be understood that many variants are possible.

Such variants will be apparent for the person skilled in the art and are considered to fall within the scope of the invention as defined in the following claims.

The invention claimed is:

1. A method for transmitting a message from an online object to an offline object, the method comprising the steps of:
   providing an online object that generates a message including identification data of a target offline object
   providing a web-based message exchange server, a mobile device, and the target offline object,
   transmitting the message from the online object to the web-based message exchange server,
   receiving, at the message exchange server, the message that is generated and transmitted by the online object,
   forwarding, by the message exchange server, the message to the mobile device, while the mobile device is connected to the message exchange server via a wireless data channel,
   receiving, by the mobile device, the message from the message exchange server,
   storing the received message in a memory of the mobile device for delivering the message at a later instant,
   establishing a data connection between the mobile device and the target offline object, including a substep of moving the mobile device to the neighborhood of the offline object,
   delivering the message at the target offline object, via the established data connection, and
   receiving, at the target offline object, the message from the mobile device,
      wherein the step of establishing a data connection between the mobile device and the target offline object is performed upon receipt of the message from the message exchange server at the mobile device, and
      wherein the step of delivering the message at the target offline object includes the substep of verifying whether the identification data included in the message correspond to identification features of the target offline object.

2. A method according to claim 1, wherein the message exchange server and the mobile device are intermittently or permanently connected.

3. A method according to claim 1, further including the step of storing the message received by the message exchange server in a message queue.

4. A method according to claim 1, wherein the step of forwarding the message from the message exchange server to the mobile device includes the substeps of:
   establishing a connection between the message exchange server and the mobile device;
   checking whether a message has been received by the message exchange server during a time period running from a disconnection instant of a previous connection period wherein the message exchange server and the mobile device were connected, and
   transmitting any message that has been received in said time period.

5. A method according to claim 1, wherein the step of forwarding the message from the message exchange server to the mobile device includes the substep of notifying the mobile device that a message has been received.

6. A method according to claim 1, wherein the step of forwarding the message from the message exchange server to the mobile device includes an eligibility test.

7. A method according to claim 1, wherein the step of delivering the message at the target offline object includes the substep of verifying whether the identification data included in the message correspond to identification features of the target offline object.

8. A method according to claim 1, wherein the data connection between the mobile device and the target offline object is temporary.

9. A method according to claim 1, wherein the step of establishing a data connection between the mobile device and the target offline object is performed upon receipt of the message from the message exchange server at the mobile device.

10. A method according to claim 1, further comprising the steps of:
    generating, by the offline object, a second message including identification data of the offline object, and
    transmitting the second message to the mobile device for forwarding the second message to the message exchange server to deliver the second message at the online object.

11. A method according to claim 1, wherein the data connection between the mobile device and the target offline object is terminated after receiving the message from the mobile device at the target offline object or after receiving the second message from the target offline object at the mobile device.

12. A method according to claim 1, further comprising the step of encrypting the message by the online object or the message exchange server.

13. A method according to claim 1, further comprising the step of verifying whether the mobile device is authorized to deliver the message at the offline object.

14. A network, comprising an online object, a web-based message exchange server, a mobile device, and a target offline object,
    wherein the online object is configured for performing the steps of:
       generating a message including identification data of a target offline object; and
       transmitting the message from the online object to the web-based message exchange server,
    wherein the web-based message exchange server is configured for performing the steps of:
       receiving the message that is generated and transmitted by the online object,
       forwarding the message to the mobile device, while the mobile device is connected to the message exchange server via a wireless data channel,
    wherein the mobile device is configured for performing the steps of:

receiving the message from the message exchange server, establishing a data connection between the mobile device and the target offline object, including a substep of moving the mobile device to the neighborhood of the offline object, and delivering the message at the target offline object, via the established data connection, and wherein the target offline object is configured for performing the steps of:

establishing a data connection between a mobile device and the target offline object, and receiving, at the target offline object, the message from the mobile device, wherein the step of establishing a data connection between the mobile device and the target offline object is performed upon receipt of the message from the message exchange server at the mobile device, and wherein the step of delivering the message at the target offline object includes the substep of verifying whether the identification data included in the message correspond to identification features of the target offline object.

15. A non-transitory computer-readable medium having a computer program embodied thereon for transmitting a message from an online object to an offline object, the computer program comprising computer readable code for causing a processing unit to perform the steps defined in the method of claim 1.

* * * * *